(12) United States Patent
McCullers et al.

(10) Patent No.: US 6,636,814 B1
(45) Date of Patent: Oct. 21, 2003

(54) LIGHT RAIL VEHICLE HAVING PREDICTIVE DIAGNOSTIC SYSTEM FOR MOTOR DRIVEN AUTOMATED DOORS

(75) Inventors: Curtis W. McCullers, Scottdale, PA (US); Kenneth A. Karg, Belle Vernon, PA (US); Dean J. Campbell, Jefferson Hills, PA (US); Andreas H. Etzel, Karlsruhe (DE); Alice E. Smith, Auburn, AL (US)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 10/111,926
(22) PCT Filed: Nov. 3, 2000
(86) PCT No.: PCT/US00/30348
  § 371 (c)(1),
  (2), (4) Date: Aug. 22, 2002
(87) PCT Pub. No.: WO01/34446
  PCT Pub. Date: May 17, 2001

Related U.S. Application Data

(60) Provisional application No. 60/163,845, filed on Nov. 5, 1999.

(51) Int. Cl.$^7$ ............................................. B61B 13/00
(52) U.S. Cl. ............................ 702/34; 701/19; 700/83; 709/318
(58) Field of Search .......................... 702/34; 701/19, 701/29, 34, 40, 79; 700/83; 709/318

(56) References Cited

U.S. PATENT DOCUMENTS 6,400,996 B1 * 6/2002 Hoffberg et al. ............. 700/83

* cited by examiner

Primary Examiner—Kamini Shah

(57) ABSTRACT

Disclosed is a light rail vehicle having a predictive diagnostic system for a motor driven automated door (100) to enable condition-based maintenance. The light rail vehicle (110) has an automated door system (112), at least one data acquisition board (114), a data collection program (116), an exponential smoothing algorithm (118), and a neural network (120). The need for maintenance is identified through the collection of various door system (112) parameters, calculating current energy and time consumption from these parameters, and determining the rate of degradation based on current energy and time consumption of the door system (112) as compared with historical energy and time consumption. From the rate of degradation, maintenance can be scheduled as needed.

11 Claims, 3 Drawing Sheets

LIGHT RAIL VEHICLE HAVING PREDICTIVE DIAGNOSTIC SYSTEM FOR MOTOR DRIVEN AUTOMATED DOORS

This application claims benefit of provisional application 60/163,845 filed Nov. 5, 1999.

BACKGROUND OF THE INVENTION

1. Field of the Invention

The present invention is directed to a light rail vehicle with a predictive diagnostic system for a motor driven automated door system. The diagnostic system monitors the automated door system to enable condition-based maintenance.

2. Description of the Prior Art

A motor driven automated door system of a light rail vehicle is an electromechanical system that degrades over time. Currently, the automated door system requires labor-intensive preventative maintenance in order to ensure high reliability. This "time-based" maintenance approach results in the system and its components being maintained even when there is no need for maintenance, resulting in high maintenance costs, ineffective use of maintenance resources, and significant downtime.

SUMMARY OF THE INVENTION

It is an object of this invention to provide an alternative to scheduled preventative maintenance of a light rail vehicle automated door system that will reduce maintenance costs and increase maintenance efficiency while maintaining or increasing the availability of the automated door system.

Accordingly, we have developed a predictive diagnostic system for use with a light rail vehicle automated door system to monitor the door system and identify when maintenance is necessary based on measured door system conditions. The predictive diagnostic aspect of the present invention requires knowing normal and failure door system conditions, determining current state door characteristic deviations, calculating rate towards failure conditions, and invoking maintenance before failure conditions occur.

As the automated door system operates, weather conditions, foreign substances in the path of the doors or in the door tracks, normal wear of components through friction and stress, people holding the doors open, etc. cause degradation of system components, such as the electrical motor, levers, rollers, and/or tracks. This degradation leads to failures, such as improper opening and closing of the door, worn out rollers, a bent operator arm, and a worn out operator arm track. These failures increase the frictional resistance against the door, causing the motor to work harder. Therefore, the effect of friction on the door is an important diagnostic parameter for the automated door system.

The predictive diagnostic system for the automated door system of a light rail vehicle according to the present invention monitors the motor driven door system and determines its current health and rate of degradation. During operation of the door system, several parameters are checked for characteristic deviations that indicate an impending system failure. Deviations are detected by comparing the current state of the parameters to past parameter values, whereby the current health and the rate of degradation of the door system are determined. From the rate of degradation and a known point where the system requires maintenance, a predicted time to failure can be determined. In turn, an indication of the required maintenance can be provided, thereby avoiding unnecessary preventative inspection of healthy equipment.

The diagnostic system, therefore, is able to predict door system failures far enough in advance so that the required maintenance can be performed during scheduled maintenance periods. The benefit of using predictive diagnostics is that the automated door system will not be over-maintained, but rather maintained only when necessary, resulting in a reduction in degradation-type failures, a reduction in maintenance costs, an increase in maintenance efficiency, and an increase in system availability.

DESCRIPTION OF THE PREFERRED EMBODIMENTS

Figure 1:
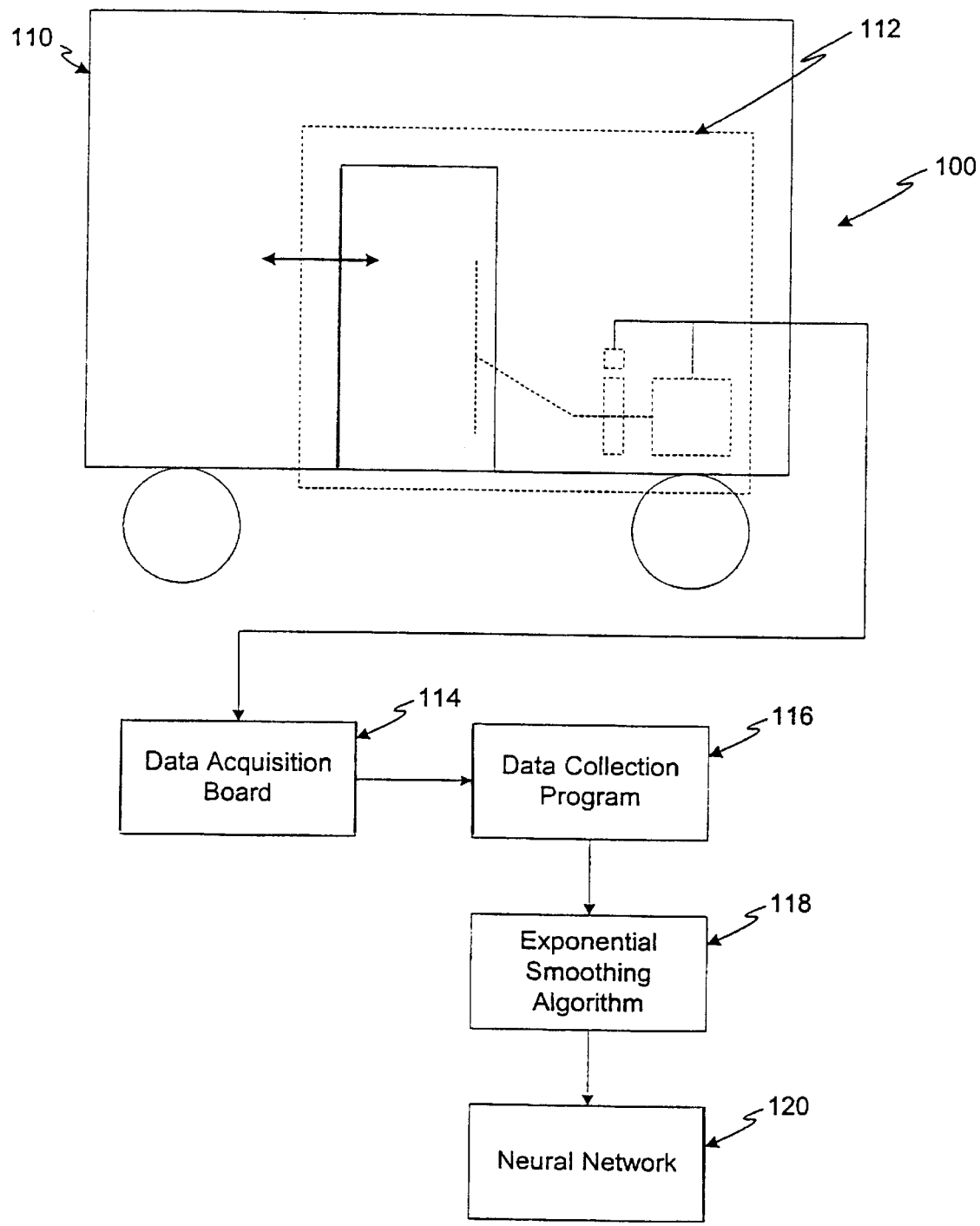
FIG. 1 is a schematic view of the present invention.

A complete understanding of the invention will be obtained from the following description when taken in connection with the accompanying drawing figures wherein like reference characters identify like parts throughout.

FIG. 1 illustrates a light rail vehicle with a predictive diagnostic system for a motor driven automated door 100 according to the present invention. The present invention includes a light rail vehicle 110, an automated door system 112, at least one data acquisition board 114, a data collection program 116, an exponential smoothing algorithm 118, and a neural network 120 (the data collection program 116, the exponential smoothing algorithm 118, and the neural network 120 are computer based programs).

A neural network is a computer model capable of drawing conclusions from a set of conditions. (See Fausett, L., *Fundamentals of Neural Networks*, Prentice Hall (1994); Haykin, S., *Neural Networks—A Comprehensive Foundation*, Prentice Hall (1994).) Neural networks are trained using observations collected from the system under investigation. Once trained, the neural network recognizes patterns similar to those it was trained on and classifies the new patterns accordingly. The neural network of the present invention is used as a state assessment tool. Thus, prior to use in the predictive diagnostic system for a light rail vehicle automated door system 100, the neural network, has to learn various system conditions by comparing models of the observed system, the system in normal operation (i.e., operating to specifications), and the system running into failure.

For example, data may be collected for training the neural network by setting up a test door system to simulate the door system in operation. Data may be collected while the system is operated under normal conditions (i.e., running to specifications). Friction may be applied to the system to simulate the door system running with degradations in the system. Different amounts of friction may be applied to simulate different stages or types of degradation. Known failed parts may be installed to simulate the system running under failure conditions. The data collected at the various states of system operation may then be fed to the neural network for training purposes.

Figure 2:
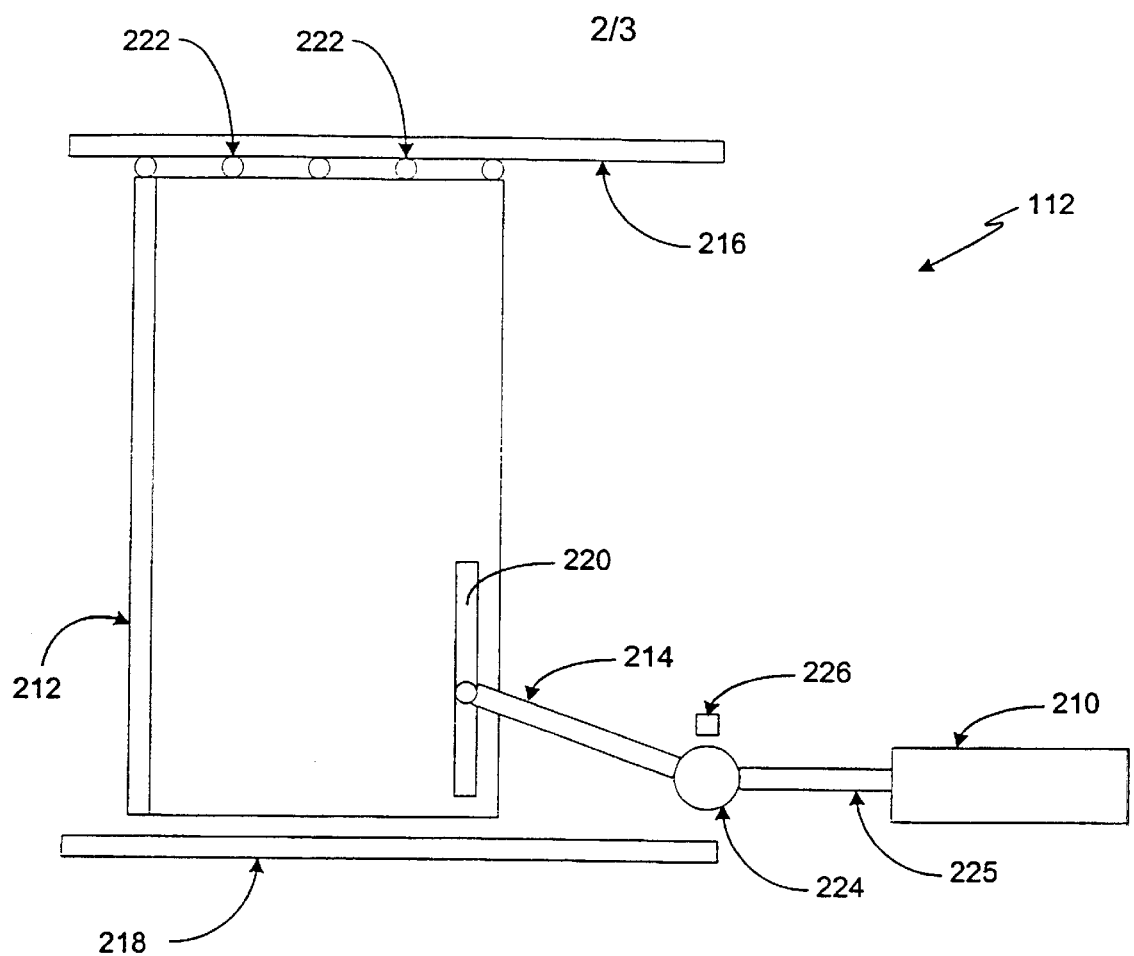
FIG. 2 is a front plan view of the automated door system of FIG. 1.

FIG. 2 illustrates a light rail vehicle automated door system 112. Typically, the light rail vehicle 110 has four pairs of doors 212, with each door 212 controlled by a dedicated door system 112. Each door system 112 typically has a motor 210, a door 212, an operator arm 214, an upper track 216, a lower track 218, and a plurality of switches 226 fixedly positioned around a cam 224 that is coupled to a shaft 225 of the motor 210. Each door 212 also has an operator arm track 220 and rollers 222. The switches 226 are utilized to monitor a position of the door 212 as a function of a lobe of the cam 224 engaging each switch in response to rotation of the cam 224 when the motor 210 opens and/or closes the door 212. Alternatively, the door system 112 may be any conventional door system used with light rail vehicles. For example, the door system 112 may use encoders (not shown) instead of a cam 224 and switches 226 to determine the position of the door 212. As another example, the door system 112 may be a sympathetic drive system with a screw drive (not shown) that drives both doors 212 of a pair of doors or with a pair of screw drives (not shown) for driving both doors 212.

In use with the above-described typical configuration, each automated door system 112 receives signals from a control system which instruct the motor 210 to open or close the door 212. The motor 210 turns the cam 224 and the operator arm 214. The operator arm track 220 guides the movement of the operator arm 214. The movement of the operator arm 214 pulls or pushes the door 212 to an open or closed position. The top of the door 212 has rollers 222 that ride in the upper track 216 for guidance. The bottom of the door 212 is guided by the lower track 218. As the door 212 goes through its cycle, a lobe of the cam 224 selectively causes each switch 226 to activate and connect or disconnect resistors in an electrical circuitry of the system 112 to change the speed of the moving door 212, as well as other door control functions. Activation of the switches 226 also indicates the position of the door 212 through its travel. Again, any conventional door system or system that indicates the position of the door 212 through its open and close cycle may be utilized.

Referring to FIGS. 1 and 2, the light rail vehicle predictive diagnostic system 100 monitors the motor driven door system 112 and determines its current health and rate of degradation. As the door cycles open and closed, the motor 210 turns the cam 224 and the operator arm 214. The switches 226 send signals to the data acquisition board 114 based on the position of the cam 224. These signals indicate the position of the door 212 through the cycle. Motor 210 current and voltage are also sent to the data acquisition board 114. Preferably, the data acquisition board 114 collects 100 samples per second. However, other sampling rates may be used.

Data collected by the data acquisition board 114 is processed by the data collection program 116. The data collection program 116 may be integral with the data acquisition board 114 or may execute in a computer, for example, a laptop personal computer. The data acquisition board 114 may send the data to the data collection program 116 on a computer via an RS485 serial network, although other networks can be used. The computer may house the data acquisition board 114 and the data collection program 116. The data collection program 116 may be written in the C++ language. The data collection program 116 may be designed to collect data when both the closing voltage and the opening voltage are not equal to zero (i.e., collecting data only when the door system 112 is operated). Data may be stored in any suitable format for the diagnostic system 100. As an example, data may be stored such that the first eight data bits are digital I/O and the remaining bits are voltage on an armature of the motor 210 during an open operation, voltage on the armature of the motor 210 during a close operation, three current measurements, temperature, and frame number (i.e., record number).

The data collection program 116 calculates energy and time consumption for the door system through its cycle. Current and historical consumption values are provided to the exponential smoothing algorithm 118 for processing into an input set to be submitted to the neural network 120. Preferably, the exponential smoothing algorithm 118 and the neural network 120 are housed on the same computer as the data collection program 116. Alternatively, more than one computer may be utilized for the data collection program 116, the exponential smoothing algorithm 118, and the neural network 120. Where more than one computer is utilized, the computers may be able to communicate with each other.

The neural network 120 determines the rate of degradation. From the rate of degradation and a known point where the door system 112 requires maintenance, a predicted time to failure can be determined. Maintenance is scheduled based on the rate of degradation. The particular benefit of predictive diagnosis is the ability to anticipate failure before it actually happens.

The neural network of the present invention can be one of any conventional neural network paradigms. The preferred embodiment of the present invention utilizes one of the following neural networks: backpropagation, cascade correlation network, or radial basis function. These three neural networks are supervised networks that serve as universal function approximators.

Figure 3:
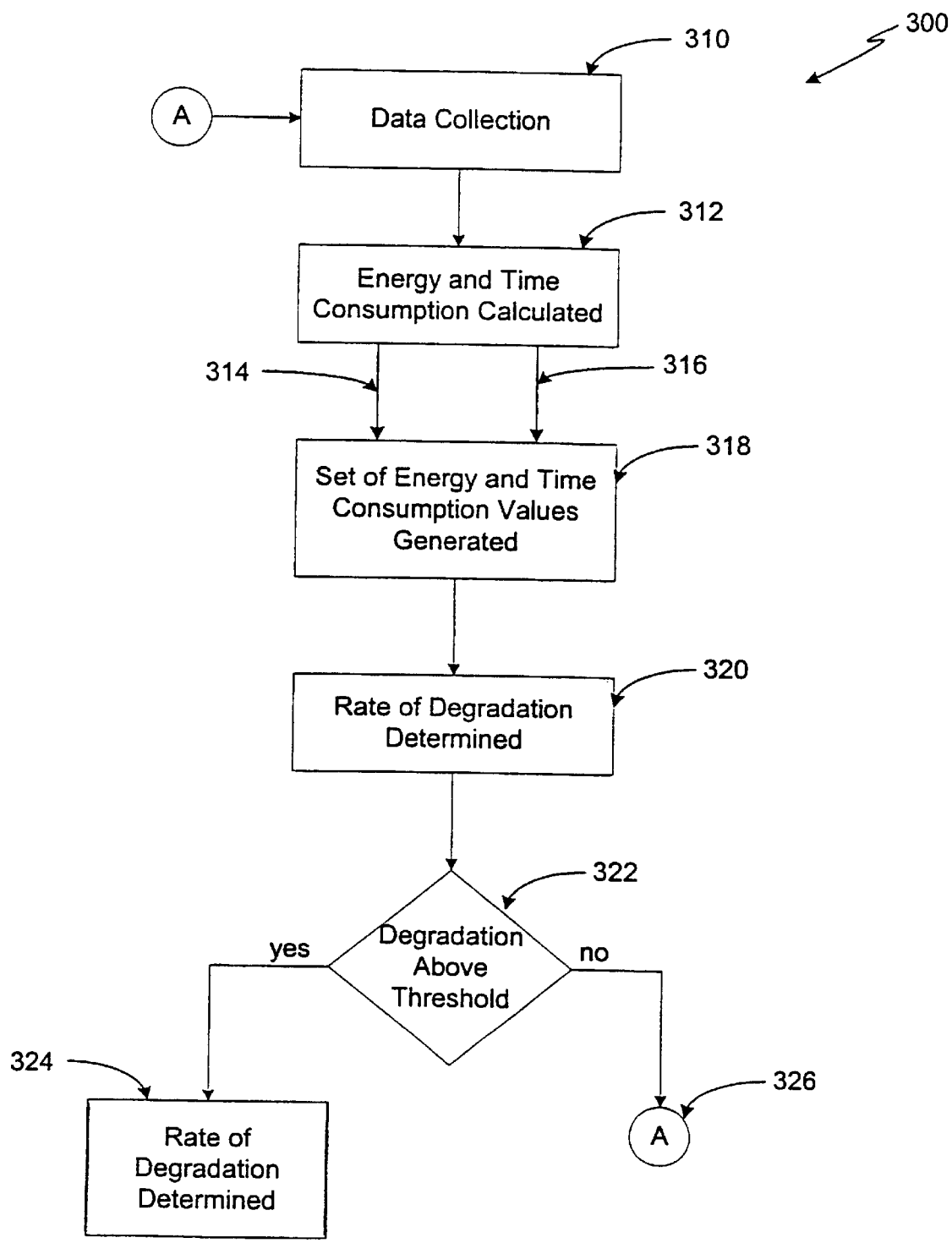
FIG. 3 is a flow diagram illustrating the general process according to the present invention.

FIG. 3 illustrates the general process 300 of the predictive diagnostic system for the light rail vehicle motor driven automated door 100. The data acquisition board 114 is used in step 310 to collect data from the automated door system 112. The data collected includes motor current motor voltage, and switch signals through discrete positions of door travel. The data acquisition board 114 sends the data to the data collection program 116. The current used by the door motor is used to determine current through the motor by subtracting the current through either an open or closed resistor circuit from the total current. The armature voltage data is used in energy and door power calculations. Data from the door switches is used for timing information and door status.

In step 312, the data collection program 116 calculates current energy and time consumption values for the system. For the light rail vehicle automated door system 112 of the present invention, energy is calculated as:

$$I = \frac{c_3 V_{sg}}{c_4 c_5}$$

where I denotes the current, $V_C$ and $V_D$ represent closing voltage and opening voltage, respectively, $V_{sg}$ denotes the voltage shunt to the ground, and T denotes the time between two samples. $c_1$, $c_2$, $c_3$, $c_4$, and $c_5$ are conversion factors selected for the given circuit in the preferred embodiment where five switches are used to measure door position. The data collection program 116 sends both current and historical energy and time consumption values to the statistical smoothing algorithm 118 in steps 314 and 316, respectively.

In step 318, the exponential smoothing algorithm 118 produces a set of energy and time consumption values based on the current and historical energy and time consumption data. The exponential smoothing algorithm 118 reduces noise in the data and detects the trend of the degradation. The exponential smoothing algorithm 118 is a well-known algorithm customized for use in the present invention as follows:

| O-S-A (One-Step-Ahead) Forecast $F_t = S_{t-1} + G_{t-1}$ | |
|---|---|
| Mean $S_t$ | $= \alpha D_t + (1 - \alpha)(S_{t-1} + G_{t-1})$ |
|  | $= \alpha D_t + (1 - \alpha)F_t$ |
| Trend $G_t$ | $= \beta(S_t - S_{t-1}) - (1 - \beta)G_{t-1}$ | where $D_t$ represents the original data and $\alpha$ and $\beta$ denote smoothing constants which are chosen based on the system. In order to compare the effect of various smoothing constants, a Mean of Absolute Forecast Error (MAFE) may be calculated for sets of $\alpha$ and $\beta$ and the set of $\alpha$ and $\beta$ having the smallest MAFE may be selected for the system.

The set of energy and time consumption values are submitted as input to the neural network 120. In step 320, the neural network 120 generates a degree of degradation of the system (conclusion) based on the set of energy and time consumption values (conditions). Degradation may be reported in terms of a confidence of a degradation prediction, an estimated severity, an estimated time to failure, and a cause of degradation ranked by likelihood. From the degree of degradation and a known point where maintenance is required (a threshold level), a predicted time to failure can be determined. The threshold level may be initially defined by maintenance personnel based on experience or manufacturer requirements. The threshold level may be adjusted as necessary. In steps 322, 324, and 326, if the degree of degradation exceeds the threshold level, for example, greater than 0.5, maintenance is recommended; otherwise, the process 300 repeats itself starting with the collection of data in step 310. In step 324, the system 112 or its components may be recommended for maintenance attention immediately or at a particular point in the future, for example, after a specific number of open and close cycles.

It will be understood by those skilled in the art that while the foregoing description sets forth in detail preferred embodiments of the present invention, modifications, additions, and changes might be made thereto without departing from the spirit and scope of the invention.

We claim:

1. A method for identifying when maintenance is required on a light rail vehicle motor driven automated door system, comprising the steps of:
   a) collecting data from the door system;
   b) calculating current energy and time consumption values for the door system based on the data;
   c) producing a set of energy and time consumption values based on the current energy and time consumption values and historical energy and time consumption values;
   d) generating a degree of degradation of the system based on the set of energy and time consumption values;
   e) generating an estimated time to failure of the system based on the degree of degradation and a known point where the system requires maintenance; and
   e) identifying maintenance needs based on the estimated time to failure.

2. The method according to claim 1, wherein the data collected in step a) includes motor current, motor voltage, and door position at a given time of the door system.

3. The method according to claim 1, wherein door position is determined through data sent from switches fixedly positioned around a cam coupled to a shaft of a motor of the door system.

4. The method according to claim 1, wherein:
   at least one data acquisition board electrically connected to the door system collects the data in step a);
   a computer electrically connected to the data acquisition board receives the data from the data acquisition board, the computer including a data collection program that calculates the current energy and time consumption values in step b);
   an exponential smoothing algorithm produces the set of energy and time consumption values in step c); and
   a neural network calculates the rate of degradation and the estimated time to failure and identifies the maintenance needs.

5. The method according to claim 4, wherein the computer also includes the data acquisition board.

6. The method according to claim 3, wherein the neural network is a backpropagation, a cascade correlation, or a radial basis function neural network.

7. An apparatus for identifying when maintenance is required on a light rail vehicle motor driven automated door system, comprising:
   means for indicating a position of a door through open and close cycles;
   at least one data acquisition board electrically connected to the motor and the means for indicating the position of the door;
   at least one computer including a data collection program, an exponential smoothing algorithm, and a neural network,
   wherein the data acquisition board collects data from the motor and the means for indicating the position of the door as the door system cycles open and closed, the data collection program and the exponential smoothing algorithm calculate a set of input values based on the data, and the neural network determines a rate of degradation and an estimated time of failure of the door system based on the set of input values and identifies when maintenance is required on the door system.

8. The apparatus according to claim 7, wherein the means for indicating the position of the door is a plurality of switches fixedly positioned around a cam coupled to a shaft of a motor of the door system.

9. The apparatus of claim 7, wherein the data collected includes motor current, motor voltage, and switch signals at a given time of the door system.

10. The apparatus of claim 7, wherein one of the at least one computer is electrically connected to the data acquisition board and includes the data collection program.

11. The apparatus of claim 7, wherein the neural network is a backpropagation, a cascade correlation, or a radial basis function neural network.

* * * * *

UNITED STATES PATENT AND TRADEMARK OFFICE
CERTIFICATE OF CORRECTION

PATENT NO.    : 6,636,814 B1
DATED         : October 21, 2004
INVENTOR(S)   : Curtis W. McCullers et al.

It is certified that error appears in the above-identified patent and that said Letters Patent is hereby corrected as shown below:

<u>Column 4,</u>
Before line 52, insert -- Energy = $I|c_1V_C - c_2V_D|c_3T$ --

Signed and Sealed this

Ninth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,636,814 B1
DATED : October 21, 2003
INVENTOR(S) : Curtis W. McCullers et al.

It is certified that error appears in the above-identified patent and that said Letters Patent is hereby corrected as shown below:

Column 4,
Before line 52, insert -- Energy = $I|c_1V_C - c_2V_D| c_3T$ --

This certificate supersedes Certificate of Correction issued March 9, 2004.

Signed and Sealed this

Thirteenth Day of July, 2004

JON W. DUDAS
*Acting Director of the United States Patent and Trademark Office*